| (12) | United States Patent | (10) Patent No.: | US 10,363,962 B2 |
|---|---|---|---|
| | Merrill | (45) Date of Patent: | Jul. 30, 2019 |

(54) SPINDLE SYSTEM FOR WHEEL ALIGNMENT CORRECTION

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH); Zachary Alexander Merrill, Greenville, SC (US)

(72) Inventor: Zachary Alexander Merrill, Greenville, SC (US)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 253 days.

(21) Appl. No.: 15/547,673

(22) PCT Filed: Nov. 18, 2014

(86) PCT No.: PCT/US2014/066109
§ 371 (c)(1),
(2) Date: Jul. 31, 2017

(87) PCT Pub. No.: WO2016/080959
PCT Pub. Date: May 26, 2016

(65) Prior Publication Data
US 2018/0009479 A1    Jan. 11, 2018

(51) Int. Cl.
*B62D 17/00* (2006.01)
*B60G 9/00* (2006.01)
(Continued)

(52) U.S. Cl.
CPC .......... *B62D 17/00* (2013.01); *B60B 27/0057* (2013.01); *B60B 27/0078* (2013.01);
(Continued)

(58) Field of Classification Search
CPC .......... B60G 2200/46; B60G 2200/462; B60G 9/00; B62D 17/00; B60B 27/0057;
(Continued)

(56) References Cited

U.S. PATENT DOCUMENTS 3,401,981 A * 9/1968 Adams ................... B60B 27/065
301/132
3,520,377 A * 7/1970 Wallace ................... B60B 37/00
180/7.1
(Continued)

FOREIGN PATENT DOCUMENTS

FR    2965786 A1    4/2012
WO   2013/104427 A1   7/2013

OTHER PUBLICATIONS

European Patent Office, Notification of Transmittal of the International Search Report and the Written Opinion of the International Searching Authority, Published Sep. 7, 2015, European Patent Office, RijSwijk, Netherlands, pp. 1-9.
(Continued)

*Primary Examiner* — Kip T Kotter
(74) *Attorney, Agent, or Firm* — Neal P. Pierotti

(57) ABSTRACT

A spindle sleeve and washer for adjusting the camber, toe, or thrust angle of a vehicle wheel to a desired predetermined angle which allows for use of existing hub and spindle assembly without permanent modification to the vehicle.

13 Claims, 11 Drawing Sheets

(51) Int. Cl.
  *F16D 51/20* (2006.01)
  *F16D 65/09* (2006.01)
  *F16D 65/22* (2006.01)
  *F16D 51/00* (2006.01)
  *B60B 27/00* (2006.01)
  *B60B 27/02* (2006.01)
  *B60B 35/02* (2006.01)
  *B60B 35/00* (2006.01)
  *F16D 1/10* (2006.01)

(52) U.S. Cl.
  CPC ............ *B60B 27/02* (2013.01); *B60B 35/009* (2013.01); *B60B 35/02* (2013.01); *B60B 35/025* (2013.01); *B60G 9/00* (2013.01); *F16D 51/00* (2013.01); *F16D 51/20* (2013.01); *F16D 65/09* (2013.01); *F16D 65/22* (2013.01); *B60B 27/001* (2013.01); *B60B 2900/541* (2013.01); *B60G 2200/46* (2013.01); *B60G 2200/462* (2013.01); *B60G 2204/61* (2013.01); *B60G 2206/50* (2013.01); *B60G 2206/99* (2013.01); *B60G 2300/04* (2013.01); *F16D 2001/103* (2013.01); *F16D 2051/003* (2013.01)

(58) Field of Classification Search
  CPC ... B60B 27/0078; B60B 27/02; B60B 35/009; B60B 35/02; B60B 35/025; F16D 51/00; F16D 51/20; F16D 65/09; F16D 65/22
  See application file for complete search history.

(56) References Cited

U.S. PATENT DOCUMENTS

| | | | |
|---|---|---|---|
| 4,445,597 A | 5/1984 | Baltare | |
| 4,526,254 A | 2/1985 | Baltare | |
| 4,509,772 A * | 4/1985 | Drotar | B62D 17/00 |
| | | | 280/86.756 |
| 4,641,853 A * | 2/1987 | Specktor | B62D 17/00 |
| | | | 280/86.756 |
| 4,836,574 A * | 6/1989 | Ingalls | B60G 7/005 |
| | | | 280/86.756 |
| 5,197,786 A | 3/1993 | Eschenburg | |
| 5,553,389 A * | 9/1996 | Winslow | G01B 11/2755 |
| | | | 33/203.18 |
| 8,960,689 B1 * | 2/2015 | Williams | F16D 3/185 |
| | | | 280/5.521 |
| 2011/0291467 A1 * | 12/2011 | Severini | B60B 27/0005 |
| | | | 301/105.1 |

OTHER PUBLICATIONS

European Patent Office, Notification of Transmittal of the International Search Report and the Written Opinion of the International Searching Authority, published Mar. 21, 2016, European Patent Office, RijSwijk, Netherlands, pp. 1-10.

* cited by examiner

SPINDLE SYSTEM FOR WHEEL ALIGNMENT CORRECTION

FIELD OF THE INVENTION

The subject matter of the present invention relates to a method and apparatus to adjust camber, toe and/or thrust of a tire attached to an axle spindle stub.

BACKGROUND OF THE INVENTION

The alignment of a vehicle's wheel plane relative to the path traveled by the vehicle affects not only the handling of the vehicle but also affects the wear on the tires. As used here, alignment refers to camber, toe, and thrust. Camber is the angle between the vertical axis of the wheel and the vertical axis of the vehicle. Positive camber refers to an angle where the top of the wheel is farther away from the center of vehicle than the bottom of the wheel. Negative camber refers to an angle where the bottom of the wheel is farther away from center of the vehicle than the top. Generally speaking, camber changes of even a fourth of one degree can impact tire wear. Abnormal tire wear has been observed in certain applications with even smaller camber angles changes. Toe is the angle each wheel makes with the longitudinal axis of the vehicle. Positive toe, also referred to as toe in, is a condition where the front of the wheel is pointing in or towards the center line of the vehicle. Negative toe, also referred to as toe out, is a condition where the front of the wheel points out or away from the center line of the vehicle. Thrust is the resulting direction of travel of an axle as opposed to the direction that might be expected from the orientation of the tires on the axle. Generally speaking, toe changes of even one-tenth of a degree can have an impact on tire wear.

The typical trailer axle is made by welding a pair of spindle forgings onto a piece of axle tubing then machining the precision surfaces of both spindles simultaneously in a lathe process. The resulting axle is near perfectly straight; i.e., each spindle axis possesses zero camber and zero toe. When a typical axle is installed under a vehicle (used herein to refer to both motorized vehicles as well as trailers) and placed into normal operation under typical loading conditions, the camber does not remain at zero. The axle under load, although quite rigid, does flex. The flexing of the axle occurs because the suspension is attached to the axle at load transfer points which are significantly inboard of the ends of the axle, but the tires support the weight of the vehicle by means of attachment points which are relatively near the outboard ends of the axle. As a result of this geometry, the weight of the vehicle imposes a bending moment on the axle which in turn causes upward deflection of the ends of the axle resulting in the tires presenting a slight negative camber. As the load increases, the more negative the camber becomes. At the typical maximum legal tandem axle load in the US, it would not be unusual for the wheel camber angle to reach approximately 0.5 degrees. The contribution of tire alignment to tire wear can be particularly problematic with vehicles used for transporting heavy loads.

Once the weight is removed, the axle may recover and again affect the alignment of the wheels. Because of factors such as the additional costs and amount of material that would be required, increasing the stiffness of the axle to resolve camber issues may not be practical.

Even with the same amount of camber on each axle spindle, axle camber affects the tires differently depending on their individual wheel end position on the vehicle because most road surfaces are not flat transversely across the road. The road surface is either crowned or sloped (by about 1.5% on average) so that water will evacuate from the road surface. Trucks, in most of the world, generally operate in the right most lane, and the right most lane is usually sloped very slightly to the right. This means that all the while the vehicle is traveling on the road way, there is a gravitational pull on the rig that is pulling the vehicle to the right. This pull is resisted through the tire contact patch and the tire transmits this force to the axle by transmitting the required force opposite of the direction of pull through its interface with its wheel. The result is that as the tire rolls down the highway, the contact patch shifts leftward with respect to the wheel its wheel center. At full load and at normal pressure on a typical NGWBS tire, this shift has an effect on tire shoulder wear that is roughly the equivalent of a 0.2 degree shift in wheel camber. This means that, although the left and the right wheel may each measure approximately −0.5 degree of camber, when the shift effect is considered, the effective camber angle on the left side tires is approximately −0.7 degree, and the effective camber angle on the right side tires is approximately −0.3 degree. As a consequence of this phenomenon, the LH tires usually experience worse inboard shoulder wear than the RH tires.

When a typical tandem axle vehicle (tractor or trailer) turns, the dynamics of the vehicle favor lateral grip by the forward axle tires. As a result the pivot point of the vehicle shifts toward the forward axle tires and the rear axle tires will tend to have greater slip laterally as the vehicle negotiates a turn maneuver. For this reason, the rear tires on a tandem axle pair receive more scrub and have a faster wear rate than the tires on the forward axle. Scrub tends to arrest the development of irregular wear and thus the rear tires usually are less affected by the camber issue than are the tires on the forward axle.

So as a consequence, the tire irregular wear issue is usually worst on the inboard surface of the LF tire. Next worst is the LR tire. The RF tire comes next but is sometimes similar in severity to the LR. The most even wear usually is found on the RR tire depending upon the particular application, load, and routes normally traveled. It should be obvious that in countries such as Australia, where drivers drive on the left side of the road instead of the right side, the above would be reversed.

Therefore, a need exists for improved methods and apparatus for adjusting or correcting axle alignment. A system that allows for adjustment while minimizing the amount of disassembly and labor required would be particularly advantageous. Additional usefulness would be provided by a system that allows for adjustment of the alignment of an axle using hardware that can be used for the left or right sides of the vehicle. Further benefits would be found with an apparatus that enables a precise camber selection for each individual wheel end of the axles in a tandem pair.

SUMMARY OF THE INVENTION

Aspects and advantages of the invention will be set forth in part in the following description, or may be obvious from the description, or may be learned through practice of the invention.

In one embodiment, the present invention provides an apparatus for adjusting the angular position of a vehicle wheel attached to a spindle comprising a spindle sleeve having an outer surface of revolution about a first axis, an inner surface of revolution formed about a second axis and a washer which engages the spindle sleeve, wherein the first axis and second axis are oriented at a desired angle to induce the desired camber, toe, and thrust angles of the wheel and wherein the spindle sleeve possesses a spline that engages a complimentary spline on the spindle, preventing relative rotation of the spline and spindle, and the washer possesses a protrusion that engages a depression on the spindle sleeve, preventing relative rotation of the washer and spindle sleeve.

In another embodiment, the apparatus comprises a spindle sleeve for adjusting the angular position of a vehicle wheel attached to a spindle having an outer surface of revolution about a first axis, an inner surface of revolution formed about a second axis and a washer which engages the spindle sleeve thereby preventing rotation of the washer about the spindle sleeve, wherein the first axis and second axis are oriented at a desired angle to induce the desired camber, toe, and thrust angles of the wheel and where the spindle sleeve possesses at least one radially inward oriented protrusion in the outboard portion of the spindle sleeve, the at least one protrusion extending radially inward from the inner surface, and the spindle possesses an at least one depression, whereby, the at least one radially inward oriented protrusion on the spindle sleeve engages the at least one depression on the spindle preventing the spindle sleeve from rotating about the spindle.

These embodiments, and the embodiments that follow, provide an apparatus which enables adjustment of toe, camber and thrust angles of a tire mounted to an otherwise non-adjustable axle spindle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

The present invention provides an apparatus and method for adjusting camber, toe and thrust angle of a wheel spindle. For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

The following terms are defined as follows for this disclosure:

"Axial direction" or the letter "A" in the figures refers to a direction parallel to the axis of rotation of for example, the hub or the wheel as it travels along a road surface.

"Radial direction" or the letter "R" in the figures refers to a direction that is orthogonal to the axial direction and extends in the same direction as any radius that extends orthogonally from the axial direction.

"Equatorial plane" means a plane that passes perpendicular to the axis of rotation and bisects the hub and/or wheel structure.

"Radial plane" means a plane that passes perpendicular to the equatorial plane and through the axis of rotation of the wheel.

"Toe" means the angle of the equatorial plane of the tire with respect to the longitudinal axis of the vehicle.

"Camber" means the angle of the equatorial plane of the tire with respect to the vertical axis of the vehicle.

"Vehicle" includes motorized vehicles and non-motorized vehicles including trailers.

Figure 1:
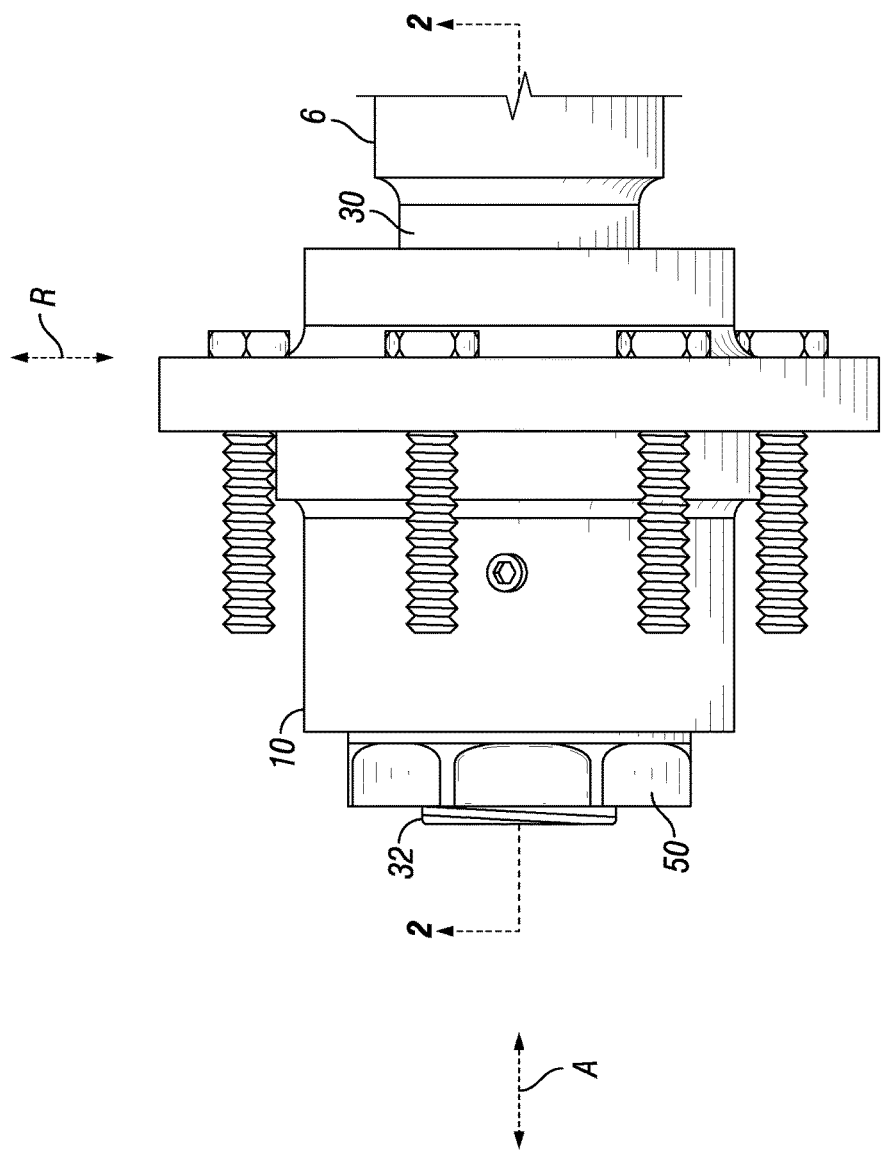
FIG. 1 provides a top view of an assembly of a vehicle hub, axle, axle nut and an embodiment of the invention to adjust camber, toe and thrust angle.

FIG. 1 provides an embodiment of an apparatus for adjusting the alignment of the axis of rotation of a hub 10 relative to a spindle 30 attached at the end of an axle 6. The hub 10 is retained on the axle 6 usually by way of an axle nut, also referred to as a spindle nut 50, which engages a threaded end 32 of the spindle 30. In this particular embodiment, the spindle and hub are typically to what may be observed on a heavy vehicle such as a truck trailer, but it should be understood that the invention disclosed could be used with other vehicle types.

Figure 2:
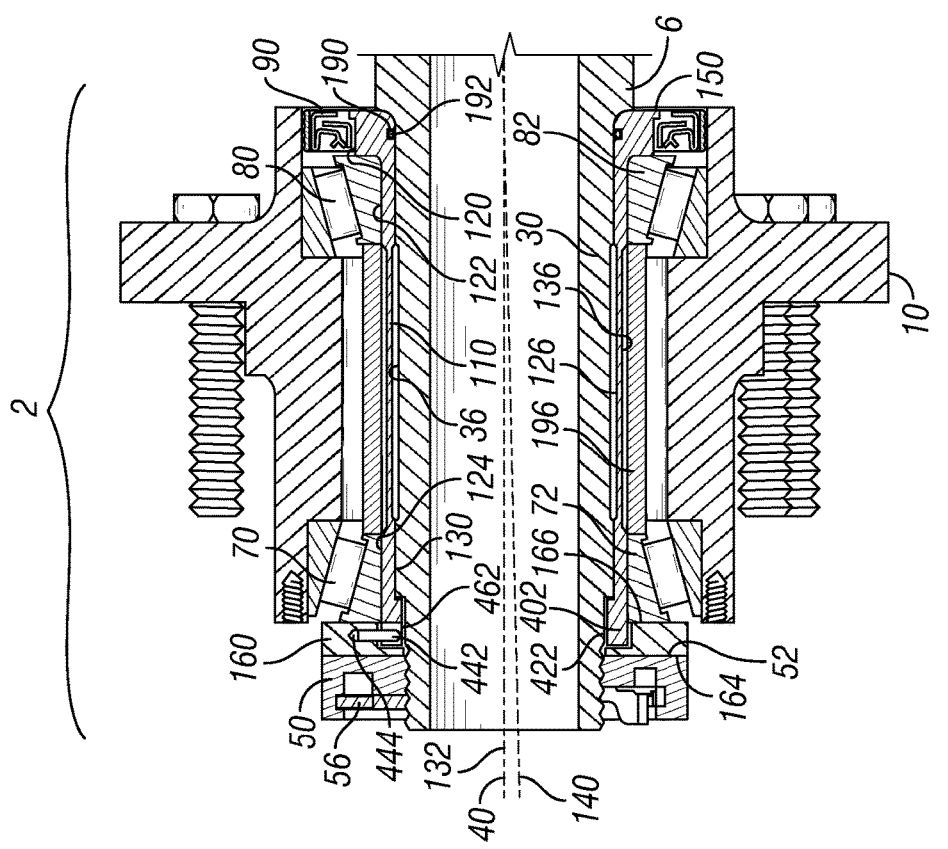
FIG. 2 provides a cross section of the assembly of FIG. 1 as taken along line 2-2 in FIG. 1.

FIG. 2 provides a cross section view of the wheel hub assembly 2 taken on line 2-2 of FIG. 1. The spindle 30 has an outer surface of revolution 36 centered upon an axis 40. In this embodiment a sleeve 110 possessing an inner surface 130 machined to a diameter so as to fit over the outer surface 36 of the spindle 30. The inner surface 130 of the sleeve 110 is a generally cylindrical surface of revolution about an axis 132. When the spindle sleeve 110 is mated with the spindle 30, the spindle axis 40 and the axis of spindle sleeve inner surface axis 132 are positionally and angularly aligned to one another such that the axes 40, 132 are geometrically the same.

The spindle sleeve 110 possesses an outer surface of revolution 136 about an axis 140 which is oriented at a predetermined angle and position relative to the spindle sleeve inner surface axis 132. This predetermined angle may be in a vertical direction (inducing a positive or negative change in camber) or horizontal direction (inducing a positive or negative change in toe) or a combination thereof (inducing a positive or negative change in camber and inducing a positive or negative change in toe). It should be appreciated that while the value of the difference in angle between the outer surface axis 140 and the inner surface axis 132 is nonzero, the difference in angle may be nonzero when viewed in a particular direction. For example the difference in angle may be zero in the horizontal where no change in toe is occurring while having a positive or negative change in angle in the vertical direction where a change in camber is occurring. The angle between the spindle sleeve inner surface axis 132 and the spindle sleeve outer surface axis 140 is chosen depending upon the desired adjustment of the camber, toe and thrust angle of the hub 10 (and attached wheel). The vertical and horizontal placement of the spindle sleeve outer surface axis 140 relative to the spindle sleeve inner surface axis 132 can be chosen maintain alignment of any brake friction surfaces, such as brake pads against a disc, or a brake shoes against a brake drum, such that the brake friction surfaces remain as close to the same alignment as was originally intended prior to the camber, toe and or thrust angle adjustment of the spindle sleeve. The vertical and horizontal placement of the spindle sleeve inner and outer surfaces is determined by choosing the intersection point of the inner surface axis and outer surface axis. In some embodiments, intersection point chosen by positioning the axes such that the intersection is located along said first axis between the brake friction surfaces thereby minimizing brake component offset.

The vertical and horizontal placement and the angular alignment of the spindle sleeve outer surface axis 140 relative to the spindle sleeve inner surface axis 132 is limited to the thickness of the spindle sleeve 110 walls. The walls must be sufficiently thick so as not to deform during handling of the sleeve 110, installation of the sleeve 110 upon the spindle 30, or operation of the vehicle as the loads are transmitted from the vehicle through the spindle 30, spindle sleeve 110, wheel bearings 70, 80, hub 10 and to the road surface.

Some torque can be expected to act upon the spindle sleeve and spindle, for example, such torque may be transferred by the friction of the bearings 70, 80, seals 90, or lubricant. The spindle sleeve 110, being mounted on a spindle 30 with an outer surface 36 having an axis of revolution about an axis 40, would be free to rotate about axis 40 if not otherwise prevented to do so. In the embodiment shown, one or more protrusions 402 extend radially inward past the spindle sleeve inner surface 130 toward the center axis 132 preventing the sleeve 110 from rotating relative to the axle spindle 30. In this particular embodiment, the one or more protrusions 402 form a spline having a plurality of protrusion 402 extending radially inward from the spindle sleeve inner surface 130. The one or more protrusions 402 each mate with a groove 422 in the outboard end of the spindle 30. The one or more protrusions 402 of the spindle sleeve 110 extend past the outer surface 36 of the spindle 30 into the groove 422. In this particular embodiment, a plurality of grooves 422 form a spline extending radially outward just at or below the outer surface 36 of the spindle 30. The plurality of grooves 422 mate with the plurality of protrusions 402 transmitting any rotational forces acting against the spindle sleeve 110 to the spindle 30 which is rotationally fixed relative to the vehicle by the vehicle's suspension. Note that while it is said that the spindle is "rotationally fixed," it is still anticipated that the vehicle suspension linkage may allow some rotation of the axle as the suspension accommodates road surfaces and vehicle loads. For example, such rotation may occur in a suspension system attached to a vehicle with a trailing arm. Any such rotation would be over a relatively small angle and the change in camber, toe and thrust would have a very minor contribution to the overall alignment of the wheel.

A washer 160 is positioned between the axle nut 50 and the inner race 72 of the outboard bearing. Here, the washer 160 is prevented from rotating by a protrusion 442 extending radially inward from the washer 160 and into a depression such as 462 in the spindle sleeve 110 outboard end portion. Here the depression 462 is in the form of a groove. In other embodiments the depression may be an aperture, hole or slot. Here it the protrusion 442 extending radially inward on the washer 160 is a pin inserted into an aperture 444 formed in the washer 160. The protrusion 442 may be a tab or tooth in other embodiments. The pin 442 may be a slightly larger diameter than the aperture 444 forming an interference fit retaining the pin.

The washer 160 possesses an outboard surface 164 aligned perpendicular to the axis 40 of the spindle 30 and an inboard surface 166 aligned perpendicular to the axis 140 of the spindle sleeve outer surface 136. The embodiment shown the outboard surface 164 and the inboard surface 166 of the washer 160 form an angle relative to one another which is identical to the angle formed between the spindle axis 40 and the spindle sleeve outer surface axis 140. The angled opposing faces on the washer 160 enables the outboard surface 164 of the washer 160 to engage the inboard surface 52 of the spindle nut 50 and the inboard face of the washer 160 to engage the outboard face of the outboard bearing cone 72 evenly distributing the axial forces around the circumference of the respective faces.

A bearing spacer 196 allows excess axial forces to transfer through the spacer and not through the bearings 70, 80 to "preset" the bearing preload. This bearing spacer 196 is machined to exact dimensions and matched relative to the dimensions of the hub 10 that define the spacing between the inboard bearing 80 and outboard bearing 70. It should be understood, that while this embodiment incorporates a bearing spacer 196 for ease of installation and ensuring proper bearing preload, other embodiments may omit the spacer 196.

The seal 90 is pressed on the inboard portion of the sleeve 110 and inboard portion of the hub 10. A seal retaining lip 150 protrudes radially outward from the spindle sleeve seal surface 120 and provides a physical stop so that the seal 90 is not pushed off the inboard end of the spindle sleeve 110. The seal 90 illustrated here is a unitized type seal which, however, it should be understood by a person of ordinary skill in the art that other seal types may be used including non-unitized positive contact lip seals.

A spindle sleeve 110 to spindle 30 seal should ideally be formed to prevent leakage of any bearing lubricant, such as oil or grease, from the inner workings of the hub 10. In this particular embodiment, a groove 190 is formed on the inner surface 130 of the spindle sleeve 110. The groove 190 receives an O-ring 192 which presses against the outer surface 36 of the spindle 30 forming a seal. Alternatively, or in addition, a sealant such as an RTV silicone gasket product may be applied to achieve a seal, with or without the groove and/or O-ring.

Figure 3:
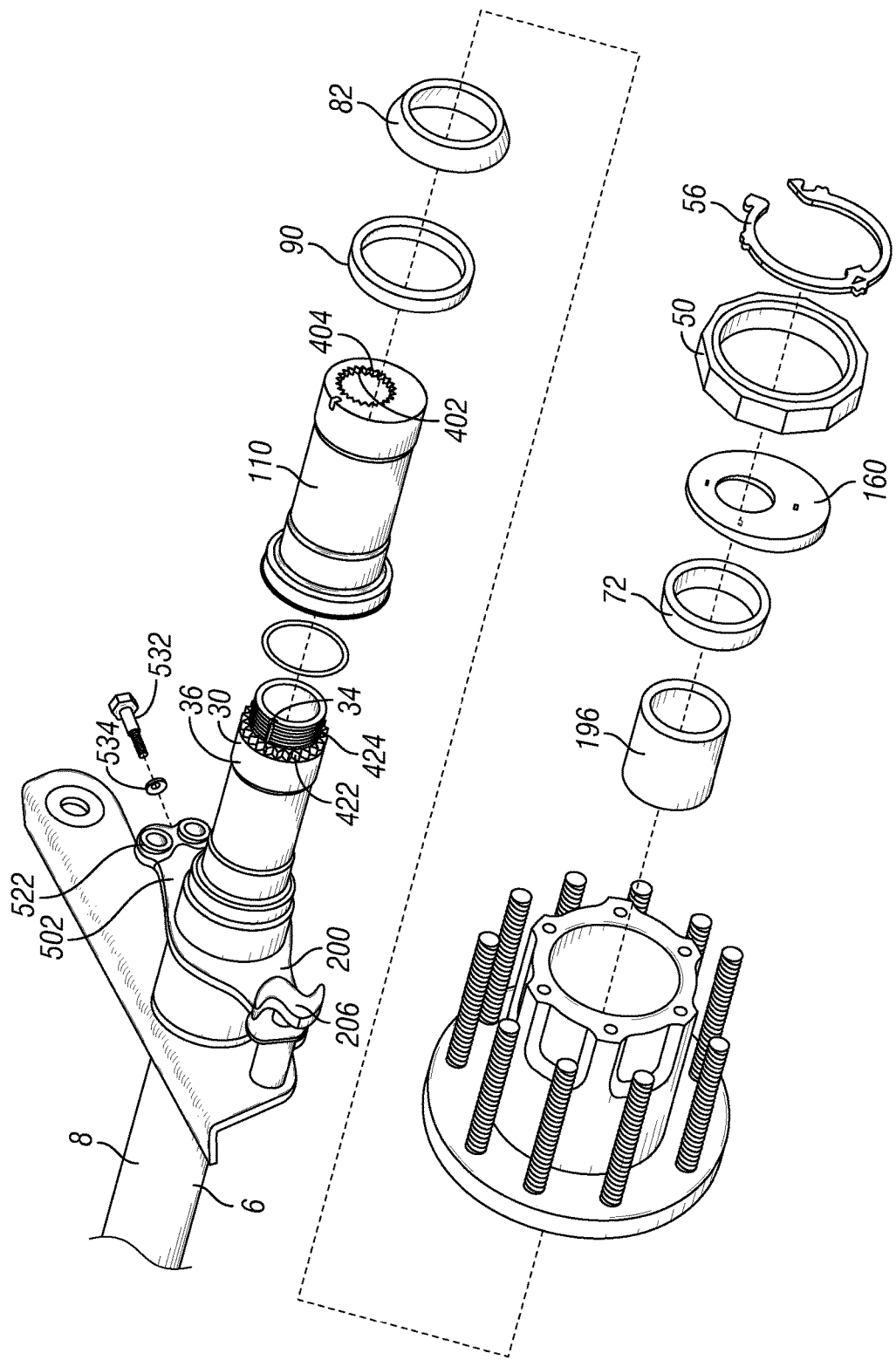
FIG. 3 provides a perspective view of the rear outboard side of the assembly an axle, spindle, spindle sleeve, spindle sleeve washer and spindle nut.

FIG. 3 shows a rear perspective view of an embodiment of the invention and a portion of a suspension of a tractor trailer. Generally, such suspension systems have spindles 30 welded to each end of an axle tube and when the suspension system is unloaded, the spindle axis 40 on each side are aligned and have zero degrees of camber and zero degrees of toe. As discussed above, the vehicle dynamics and loads placed upon the axle by the vehicle weight and cargo deflect the axle causing the spindles 30 to take on a small amount of camber. The camber sleeve 110 allows adjustment of the wheel camber, toe and thrust angles by a desired amount.

The embodiment shown here possesses a spindle 30 having a spline 424 formed in the outboard end. Illustrated here in FIG. 3, a keyway 34 is positioned on the rear of the axle. The keyway extends into the spindle wall a portion of the thickness of the spindle wall and the length of the keyway 34 extends along in the direction of the spindle axis 40. The keyway 34 allows a spindle nut lockring 56, once installed, to prevent the spindle nut 50 from rotating relative to the spindle 30. It should be noted that since the rotational position of the spindle sleeve 110 is retained and determined by the spline 424 and not the keyway 34, the keyway may be positioned at any rotational location on the spindle 30 while allowing the same spindle sleeve to be used.

The spindle sleeve 110, shown in this embodiment, possesses a plurality of radially inward oriented protrusions 402 forming a female spline 404. Each protrusion 402 of the spline 404 aligns with a corresponding groove 422 of the spindle spline 424. In this embodiment, the spindle spline 404 does not extend past the outer surface 36 of the spindle 30 to allow the bearing races 82, 72 and spacer 196 to be installed onto the spindle. Engagement of the male spline 424 with the female spline 404 prevents rotation of the spindle sleeve about the spindle axis 40.

A spindle sleeve washer protrusion 442 and a spindle sleeve slot 462 will only engage each other in one way, helping to reduce the chance for incorrect assembly while preventing rotation of the spindle sleeve washer 160 relative to the spindle sleeve 110.

The spindle nut 50 shown here is a locking spindle nut having a spindle nut lock ring 56. Such axle spindle nuts are available commercially under the brand name "PRO-TORQ®" by STEMCO. Other spindle nuts may be used within the scope of the claimed invention, including using a castle nut, a nut and retaining washer, or dual nut and a lock plate. It should also be understood that such spindle nuts may work in conjunction with cotter pin inserted through an aperture on the spindle instead of a keyway 34 as shown.

When the angle of the camber and toe is changed, the angle that the brake components attached to the axle, such as the brake shoes, changes with respect to the brake components attached to the hub, such as the brake drum. The brake components attached to the axle 6 should be attached in a manner to accommodate the change in angle. To accommodate the change of position of the brake components, an articulating brake component mounting plate can be used to attach the brake components to the axle. In this embodiment, the articulating brake component mounting plate takes the form of a spider plate 200 which possesses an outer portion 522 which pivots relative to the spider plate inner portion 502. In this embodiment, the spider plate outer portion 522 is attached to the inner portion by a bolt 532. A conical washer 534 maintains some tension against the spider plate outer portion. The one end of each brake shoe attaches to the spider plate outer portion 522.

Figure 4:
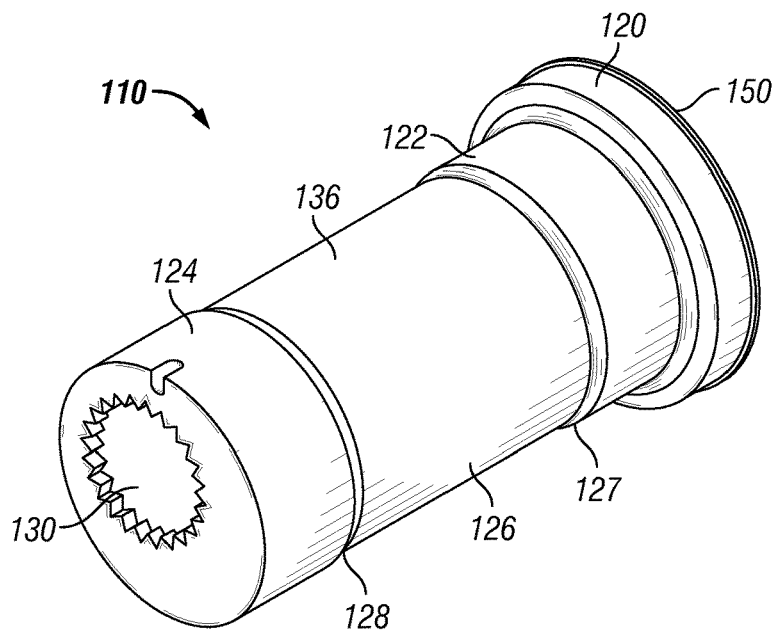
FIG. 4 is an outboard perspective view of a spindle sleeve.

FIG. 4 shows an outboard perspective view of the spindle sleeve 110. The sleeve wall thickness, measured from the inner surface 130 to the outer surface of the sleeve 136 varies depending upon azimuth location and axial location along the sleeve's length for each variation of sleeves which are designed to change the camber or toe of the wheel. The most inboard portion of the sleeve 110 contains a radially outward protruding seal retaining lip 150 to prevent dislodgement of the seal off the inboard end of the sleeve upon installation of the seal and/or hub. An inboard spindle sleeve bearing surface 122 is manufactured to a size so as to receive a cone or inner race of the inboard bearing 80. An outboard spindle sleeve bearing surface 124 is manufactured to a size so as to receive a cone or inner race of the outboard bearing 70. A reduced diameter surface 126 between the inboard bearing surface 122 and outboard bearing surface 124 having a diameter less than the inboard bearing surface 124 eases assembly of the inboard bearing 80 onto the spindle sleeve. In this embodiment, the reduced diameter surface 126 transitions to the inboard bearing surface 122 with an angled chamfer 127 and likewise the reduced diameter surface 126 transitions to the outboard bearing surface 124 with a second angled chamfer 128. The inboard bearing surface 122 and outboard bearing surface 124 diameters shown in this embodiment are identical, however, other embodiments may have the outboard bearing surface 124 smaller than the inboard bearing surface 122, such as found in TN/TQ series bearings or TR series bearings.

Figure 5:
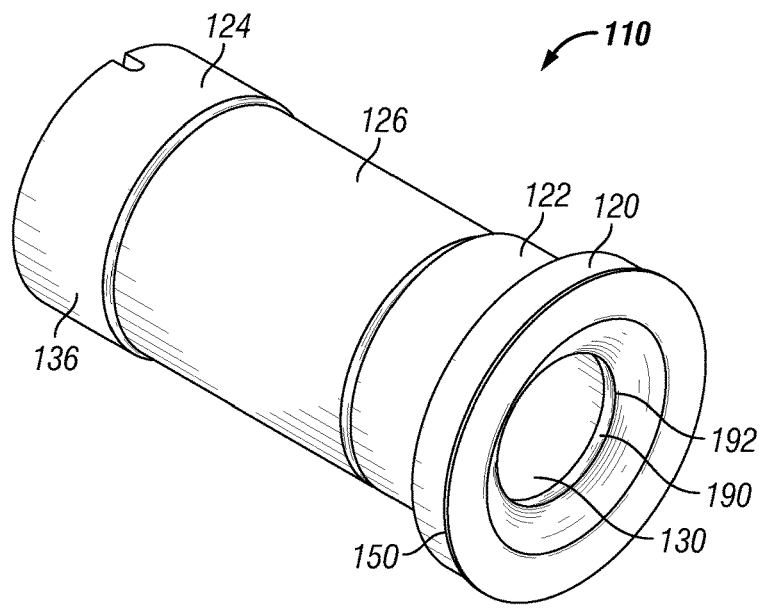
FIG. 5 is an inboard perspective view of the spindle sleeve.

FIG. 5 shows an inboard perspective view of the spindle sleeve 110. The spindle sleeve seal surface 120 on this embodiment has an appreciable larger diameter than the inboard bearing surface 122. Other embodiments within the scope of the invention may have a seal surface 120 diameter equal to that of the inboard bearing surface. In this embodiment, the inboard portion of the spindle sleeve inner surface 130 possesses a groove 190 in which a seal 192, such as an o-ring is placed to prevent leakage of lubricant the inner part of the hub from or ingress of contaminants.

Figure 6:
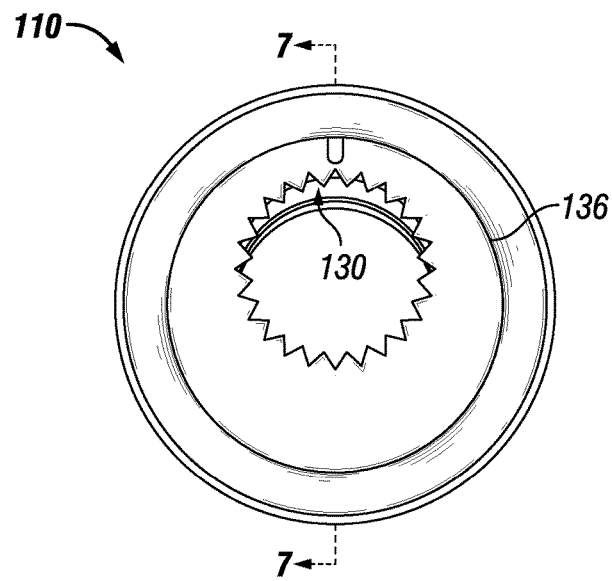
FIG. 6 is an outboard view of the spindle sleeve.

FIG. 6 shows a side view of the spindle sleeve 110 from an outboard position along the spindle sleeve 110 outer surface axis 140. The wall on the outboard portion of the spindle sleeve 110 in this embodiment is thinner at the top than at the bottom as a result of the relative positioning of the outer surface axis 140 and the spindle sleeve inner surface axis 132. The inner surface 130 can be observed along the top half of the spindle sleeve from this view since the inner surface axis 132 is angled down and away from the point of view of the figure. In this embodiment, no appreciable toe angle is present; however it can be appreciated that a variation in the angle of the inner surface axis 132 with respect to the outer surface axis 140 in the horizontal direction of a different embodiment of the invention would result in a change in the toe angle of the vehicle.

Figure 7:
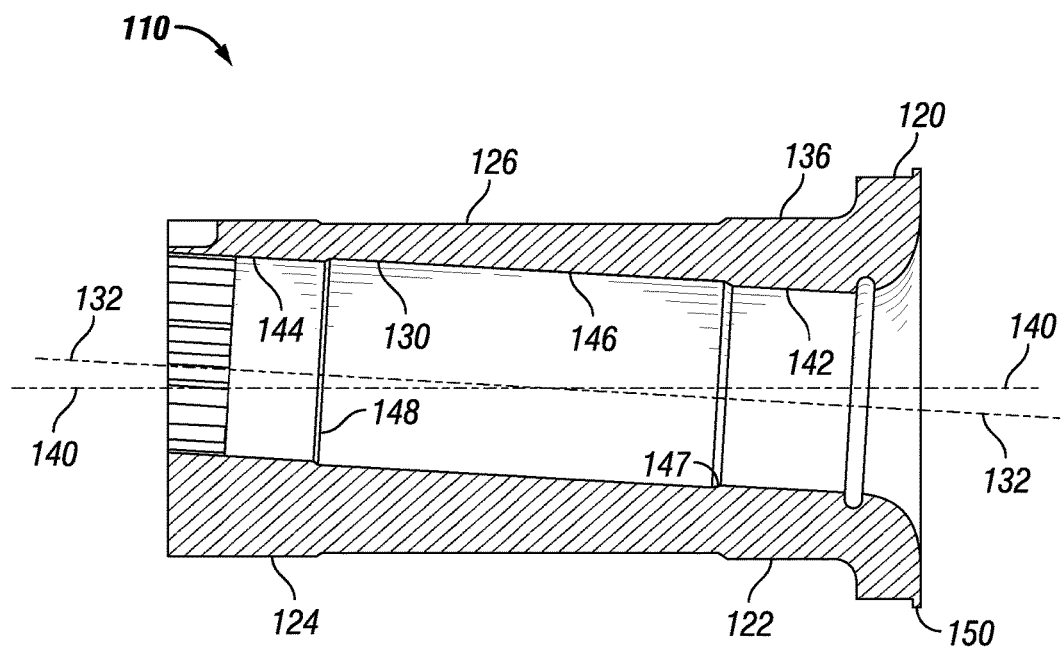
FIG. 7 is a sectional view of the spindle sleeve taken along line 7-7 in FIG. 6.

FIG. 7 shows a sectional view of an embodiment of the spindle sleeve 110 taken on line 7-7 of FIG. 6. The embodiment shown here possesses a spindle sleeve reduced diameter surface 126 in addition to a spindle sleeve enlarged diameter inner surface 146. On the inner surface 130 of the spindle sleeve 110, the spindle sleeve possesses an enlarged diameter inner surface 146 which is positioned between an inboard spindle mating inner surface 142 and an outboard spindle mating inner surface 144. The spindle mating surfaces 144, 142 are sized to mate with the spindle 30 outer surface 36. The enlarged diameter inner surface 146 of the spindle sleeve 110 eases assembly of the sleeve onto the spindle. An angled chamfer 148 is used to transition between the outboard spindle mating inner surface 144 and the spindle sleeve enlarged diameter inner surface 146. A second angled chamfer 147 is used to transition between the enlarged diameter inner surface 146 and the inboard spindle mating inner surface 142. It can be observed in this figure how the positioning and angle of the inner surface axis 132 relative to the outer surface axis 140 affects the spindle sleeve 110 wall thickness.

Figure 8:
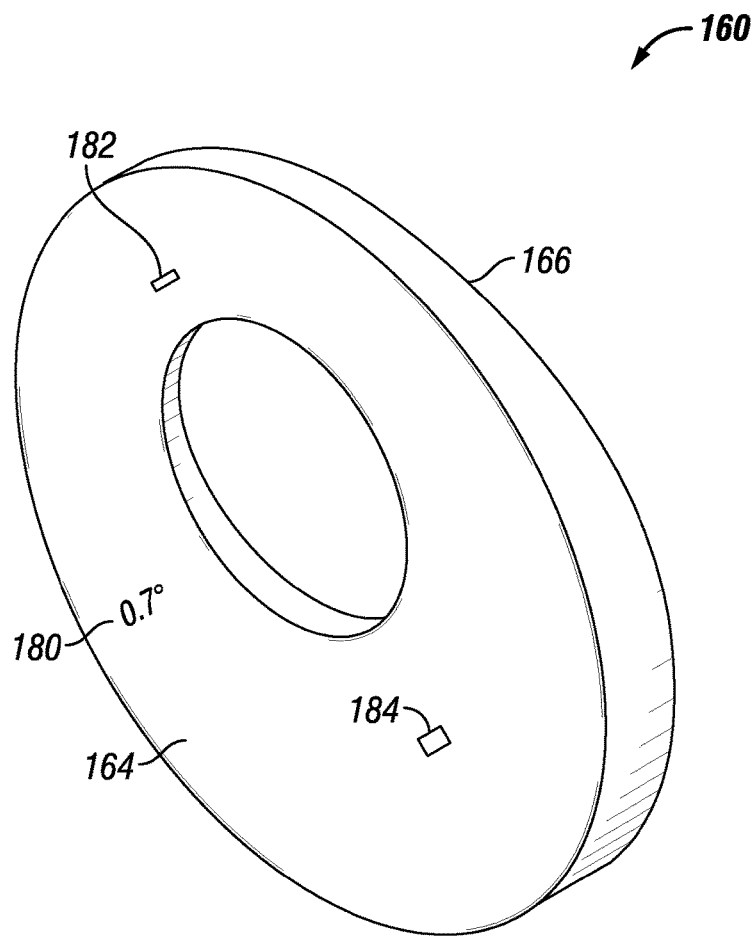
FIG. 8 is a perspective view of an axle washer.

FIG. 8 shows a perspective view of the spindle sleeve washer 160. Shown here is a 0.7 degree angled washer to match a corresponding spindle sleeve 110 having a 0.7 degree angle between the inner surface axis 132 and outer surface axis 140. Optional markings 180, 182, 184 may be made on the washer 160. For example a thick marking 184 may identify the thick portion, a thin marking 182 may identify the thin side and a degree marking 180 may identify the angle between the outboard face 164 and inboard face 166 of the spindle sleeve washer 160. Other markings may be present to aid in assembly or orientation, including markings to indicate the degree of toe, camber, top, bottom, vehicle position, right hand side, left hand side, inboard or outboard position, etc.

Figure 9:
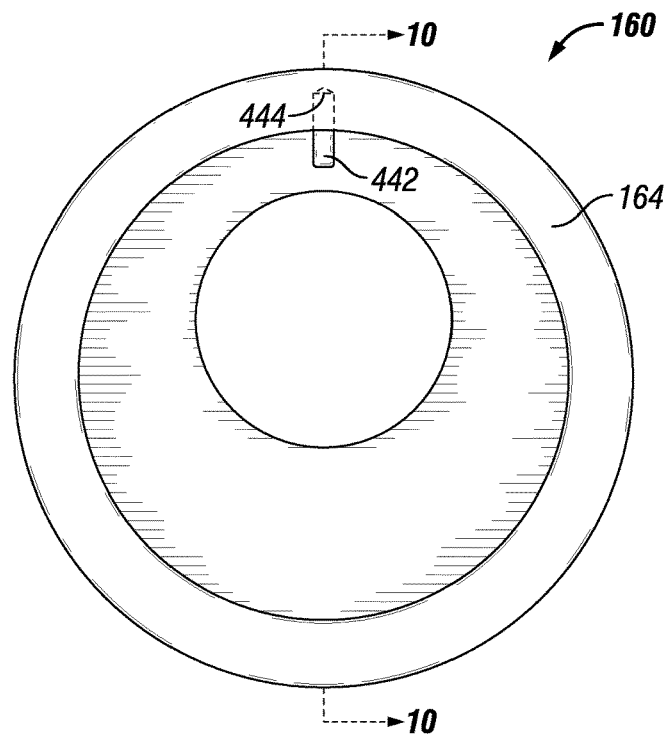
FIG. 9 is an inboard view of the axle washer.

FIG. 9 shows an outboard side view of the outboard face of the spindle sleeve washer 160. This embodiment of the washer 160 possesses a radially inward protrusion 442. In this particular embodiment, the radially inward protrusion 442 is a cylindrical shaft which is press fit into a slightly undersized aperture 444. The radially inward extending washer protrusion 442 engages a groove or aperture in the outboard portion of the spindle sleeve preventing rotation of the washer 160 relative to the spindle sleeve 110.

Figure 10:
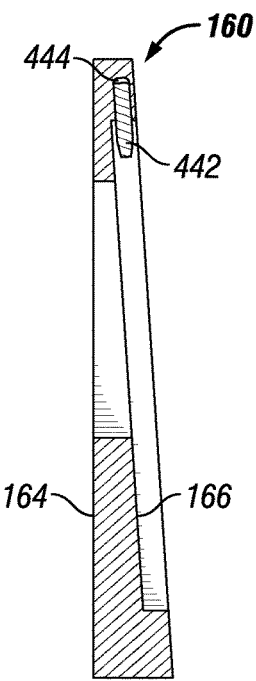
FIG. 10 is a sectional view of the axle washer taken along line 10-10 in FIG. 9.

FIG. 10 shows a radial front sectional view of the washer 160 showing the taper formed by the angle of the outboard face surface 164 relative to the inboard face surface 166. In this embodiment the angle, formed between the inboard face 166 and the outboard face 164 is 0.7 degrees, which corresponds to the embodiment of the spindle sleeve having 0.7 degree positive camber and 0 degrees toe. Should a different embodiment possess some degree of both toe and camber, the angle of the washer faces 164, 166 should be chosen to be equal to the angular offset of the outer surface 136 axis 140 from the inner surface 130 axis 132 of the camber sleeve.

Figure 11:
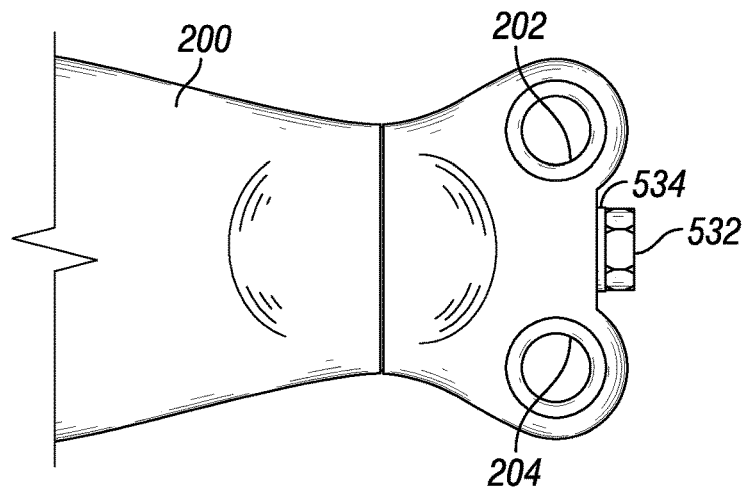
FIG. 11 is an outboard view of the articulating portion of an embodiment of a spider plate.

FIG. 11 shows a partial view of the vehicle spider plate 200 which holds components of the brake assembly together. The outer portion of the spider plate 522 is allowed to rotate about the bolt's 532 axis allowing accommodation of the change camber angle in the hub and brake drum. The brake shoes are attached at a first end to the outer portion of the spider plate 200 by brake pins which are received in a first and second aperture 202, 204 in the spider plate 200. The second end of the brake shoes rest against an "s" shaped cam 206 (FIG. 3) also referred to as the "s-cam." The s-cam 206 is rotated by an actuator (not shown) to move the brake shoes 222, 224 against a brake drum to provide braking torque. Several springs (not shown) keep the brake shoes in the proper positions against the s-cam 206 and pins 232, 234.

Figure 12:
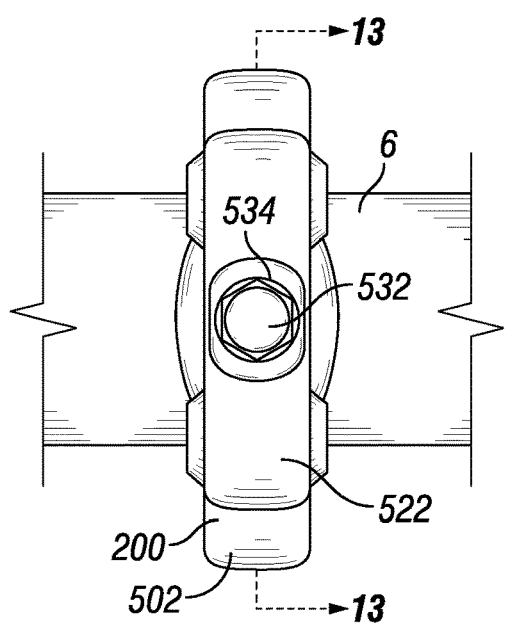
FIG. 12 is a side view of the articulating portion of the spider plate.

FIG. 12 shows a side view of spider plate 200 showing the spider plate outer portion 522 held against the spider plate inner portion 502 by a bolt 532.

Figure 13:
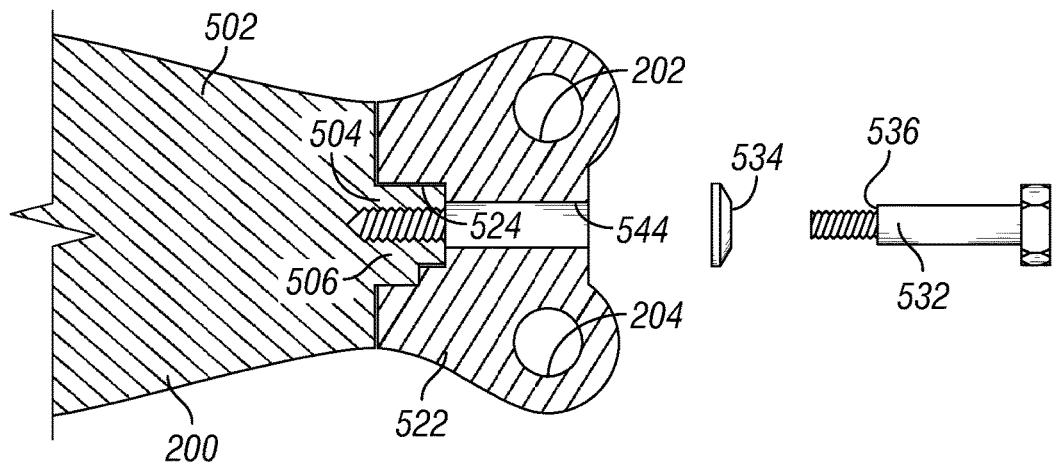
FIG. 13 is a section view of the articulating portion of the spider plate taken along line 13-13 in FIG. 12.

FIG. 13 shows a section view taken on line 13-13 of FIG. 12. In this embodiment, the spider plate inner portion 502 possesses a protruding portion 504 which is received by a socket portion 524 in the spider plate outer portion 522. The bolt 532 possesses a shoulder 536 that engages the protruding portion 504 of the inner portion of the spider plate 502. A conical washer 534 provides tension between head of the bolt 532 and the outer portion of the spider plate 522. The spider plate outer portion 522 possesses an aperture 544 allowing insertion of the bolt 532.

Figure 14:
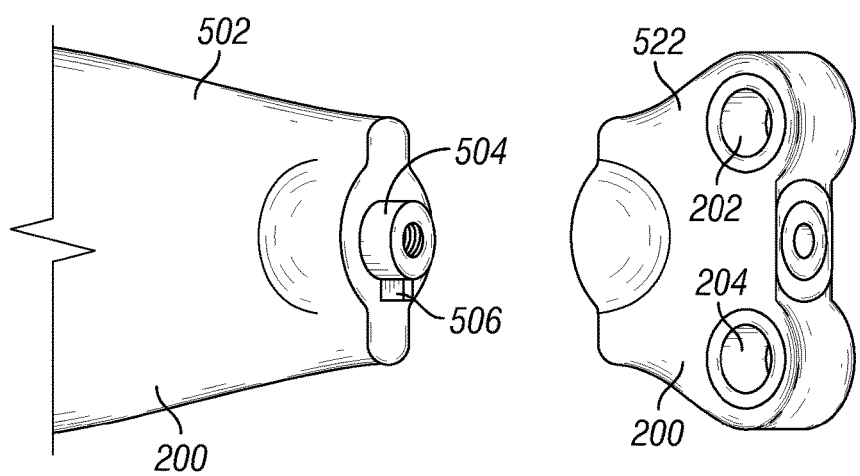
FIG. 14 is a rear outboard perspective assembly view of the articulating portion of the spider plate.

FIG. 14 shows a partial perspective view of the spider plate 200 with the inner portion 502 and the outer portion 522 separated. The inner portion 502 cylindrical protrusion 504 extends outward from the inner portion 502 and is received by a socket formed in the outer spider plate portion 522. The cylindrical protrusion 504 has a generally cylindrical shape to allow some amount of rotation of the spider plate outer portion 522 relative to the inner portion 502. A rotational stop 506 limits the amount of rotation of the inner portion 502 relative to the outer portion 522 by engaging against a part of the outer portion 522.

Figure 15:
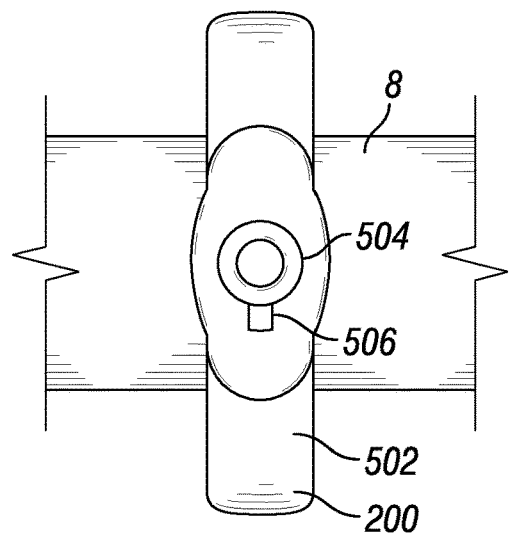
FIG. 15 is a rear side view of the spider plate with the articulating portion removed.
Figure 16:
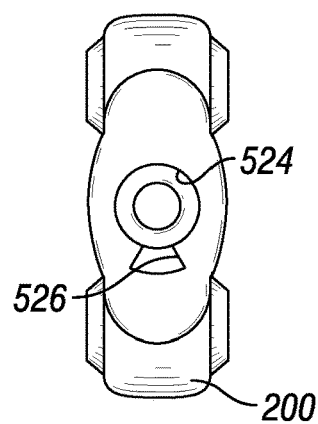
FIG. 16 is a front side view of the articulating portion of the spider plate.

FIG. 15 shows a rear side view of the spider plate inner portion 502 showing the inner spider plate cylindrical protrusion 504 and rotational stop 506. In this embodiment, the inner portion rotational stop 506 is in the shape of a tab or rectangular protrusion extending from the cylindrical protrusion 504. It should be understood by a person of ordinary skill in the art that other forms of rotational stops may be used to limit the rotational motion of the outer spider plate portion 522 relative to the inner spider plate portion 502. FIG. 16 shows an end side view of the spider plate outer portion 522 showing the socket 524 and outer spider plate rotational stop 526. The socket 524 has a generally cylindrical shape to receive the cylindrical protrusion 504. In this embodiment, the outer spider plate rotational stop 526 is a recess in the outer spider plate possessing similar dimensions to that of the inner portion rotational stop 506 but with larger dimensions in the circumferential direction of rotation around the circumference of the socket 524, allowing for a predetermined amount of rotation of the spider plate outer portion 522 relative to the spider plate inner portion 502.

Figure 17:
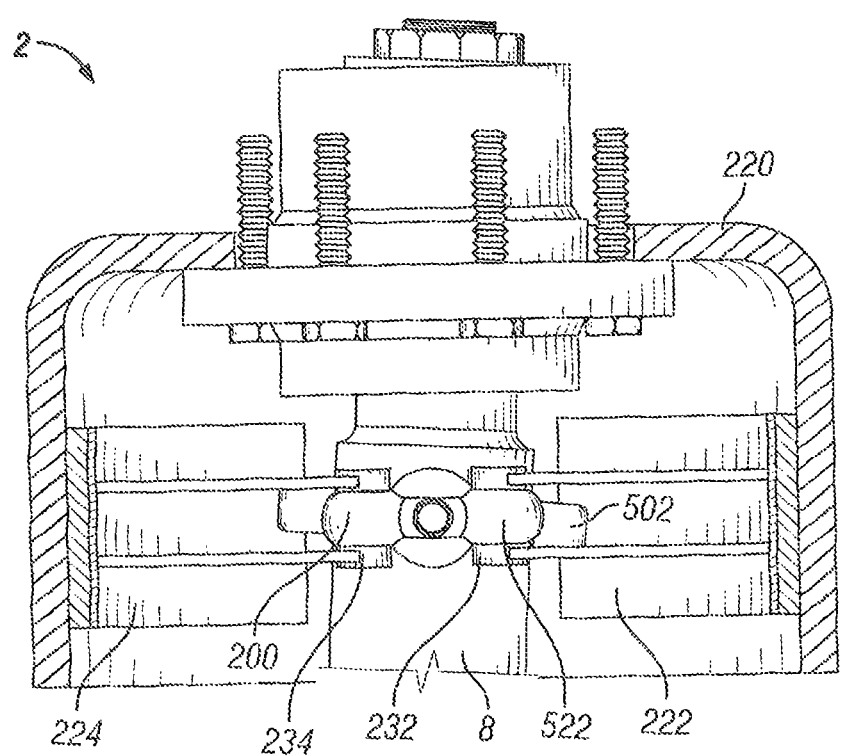
FIG. 17 is a side view of the axle assembly with a portion of the brake drum and brake pads removed for clarity.

FIG. 17 shows a side view of the wheel hub assembly 2 with a cross section view of the brake drum 220. As discussed above, the spindle sleeve 110, by design, shifts the rotational axis of the hub, and additionally shifts the angle of the drum relative to the axle and existing brake shoes 222, 224. The split spider plate 200 with the articulable outer portion 522 allows the brake shoes 222, 224 to accommodate the angle of the axis of the brake drum 220 to the axis of the axle tube 8. This ensures a more even distribution of brake forces across the brake material, more even wear, and longer brake component life.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An apparatus for inducing a desired angular orientation of an axis of revolution of a tire mounted to an axle and accommodating change in position of brake components resulting from use of said apparatus, said apparatus comprising:

a sleeve which includes an inner surface and an outer surface, an inboard end and an outboard end, said inner surface of said sleeve aligned with a surface of revolution about a first axis, said outer surface of said sleeve aligned with a surface of revolution about a second axis, said second axis positioned at a predetermined angle compared to said first axis, said outboard end possesses an at least one depression positioned on and extending radially inward past said outer surface, said sleeve possessing an at least one protrusion extending radially inward from said inner surface;

a washer which includes an outboard surface, an inboard surface, an inner surface forming an aperture, said aperture extending from said outboard surface to said inboard surface, said washer includes at least one protrusion protruding radially inward from said inner surface for engaging said at least one depression of said sleeve;

an axle spindle possessing an outer surface of revolution about a third axis, at least one depression extending radially inward past said axle spindle outer surface of revolution;

wherein when said sleeve is positioned upon said axle spindle, said sleeve protrusion engages said at least one depression of said axle spindle, preventing rotation of said sleeve about said third axis of said spindle.

2. The apparatus of claim 1 further comprising an articulating brake component mounting plate connected to said axle.

3. The apparatus of claim 2 wherein said articulating brake component mounting plate connected to said axle is further comprised of a non-articulating portion attached to said axle and an articulating portion which is attached to said non-articulating portion whereby said articulating portion pivots about an axis perpendicular to the axis of said axle.

4. The apparatus of claim 1 wherein said at least one depression on said spindle is a plurality of depressions wherein each of said at least one protrusion of said sleeve engages a depression of said plurality of depressions positioned upon said spindle.

5. The apparatus of claim 4 wherein said sleeve possesses a plurality of protrusions, each protrusion engages a depression of said plurality of depressions positioned upon said spindle.

6. The apparatus of claim 1 wherein said at least one depression of said spindle forms a male spline and said at least one protrusion of said sleeve forms a female spline, wherein said male spline and said female spline are able to engage each other allowing the relative angular position of the sleeve and spindle to be selected from a plurality of possible choices whereby once the spindle and sleeve are assembled, the male and female splines prevent relative rotation.

7. The apparatus of claim 1 wherein said at least one depression of said spindle and said at least one protrusion of said sleeve are positioned on the outboard portion of said spindle and said protrusion respectively.

8. The apparatus of claim 1 wherein said second axis is positioned at a predetermined intersection point with said first axis.

9. The apparatus of claim 8 wherein said predetermined intersection point is located along said first axis between brake friction surfaces.

10. The apparatus of claim 1 wherein said sleeve further includes a lip extending radially along the inboard end of said sleeve.

11. The apparatus of claim 1 wherein said sleeve possesses a groove positioned on said inner surface on said inboard end of said sleeve, said groove adapted to receive a seal.

12. The apparatus of claim 11 wherein said seal is an o-ring.

13. The apparatus of claim 1 wherein said washer's outboard surface and said washer's inboard surface are positioned at an angle, said angle being equal to said predetermined angle of said second axis relative to said first axis.

* * * * *